United States Patent
Parrish et al.

(10) Patent No.: US 6,988,022 B2
(45) Date of Patent: Jan. 17, 2006

(54) METHOD FOR ONLINE ESTIMATION OF REACTOR SPLIT FOR MULTIMODAL POLYOLEFINS

(75) Inventors: John R. Parrish, Cross Lanes, WV (US); William H. Sachs, Princeton, NJ (US); Mark G. Goode, Hurricane, WV (US); Jeffrey Drabish, Elkview, WV (US)

(73) Assignee: Univation Technologies, LLC, Houston, TX (US)

( * ) Notice: Subject to any disclaimer, the term of this patent is extended or adjusted under 35 U.S.C. 154(b) by 86 days.

(21) Appl. No.: 10/823,189

(22) Filed: Apr. 13, 2004

(65) Prior Publication Data

US 2005/0228543 A1 Oct. 13, 2005

(51) Int. Cl.
*C08F 2/00* (2006.01)

(52) U.S. Cl. .......................... 700/269; 526/59; 526/90; 526/348.5; 526/905

(58) Field of Classification Search ................ 700/269; 526/59, 90, 348.5, 905
See application file for complete search history.

(56) References Cited

U.S. PATENT DOCUMENTS

| 3,177,138 A | | 4/1965 | Larrison |
| 3,356,667 A | | 12/1967 | Smith et al. |
| 3,636,326 A | * | 1/1972 | Smith et al. ................. 700/269 |
| 3,972,804 A | | 8/1976 | McLaughlin et al. ....... 208/108 |
| 3,974,064 A | | 8/1976 | Bajek et al. ................. 208/134 |
| 4,469,853 A | | 9/1984 | Mori ............................ 526/59 |
| 5,627,242 A | | 5/1997 | Jacobsen et al. .............. 526/60 |
| 5,844,054 A | | 12/1998 | Samples et al. .............. 526/60 |
| 6,042,790 A | | 3/2000 | Hottovy et al. ............. 422/131 |
| 6,399,722 B1 | | 6/2002 | Szul et al. .................... 526/113 |
| 2004/0242808 A1 | * | 12/2004 | Mink et al. ................... 526/59 |

FOREIGN PATENT DOCUMENTS

| JP | 3-266450 | 11/1991 |
| WO | WO 01/49751 | 7/2001 |

* cited by examiner

*Primary Examiner*—Fred Teskin (57) ABSTRACT

The present method is directed to techniques for estimating and periodically controlling the reactor split of alpha-olefin polymerizations using multiple catalysts that selectively incorporate monomers and other reactants into polymer compositions. The method provides for the rapid determination of instantaneous reactor split and cumulative split in polymerization reactors by the use of a novel linear relationship between Incorporation and Reactor Split.

19 Claims, 6 Drawing Sheets

Figure 1. Typical Fluidized Bed Reactor Schematic

Figure 2. Split from H₂ Incorporation in Pilot Plant

Figure 3. SEC Split vs. (Hydrogen/Production Rate)

Figure 4. Split from Ethylene Incorporation

Figure 6. Split from Hydrogen Incorporation in a Commercial Scale Reactor

METHOD FOR ONLINE ESTIMATION OF REACTOR SPLIT FOR MULTIMODAL POLYOLEFINS

TECHNICAL FIELD OF THE INVENTION

The invention is related to the field of reactor control in the process of preparing olefin-based polymers containing one or more monomers. More specifically, the invention relates to the online prediction and control of reactor split (i.e., the weight fraction of a particular resin component) in multi-modal resins produced by multiple catalysts in polymerization reactors (e.g. a single-stage gas-phase reactor). Control of split is fundamental to control of resin properties and essential to maintaining product properties. The present method relies on mathematical relationships derived from kinetic and material balance models instead of physical measurements of split.

BACKGROUND OF THE INVENTION

The product characteristics of bimodal resin systems, that is resin products that are produced by more than one catalyst system, are dependent of the distribution of the molecular species. Where more than one catalyst and one or more monomer(s) are used to produce a polymeric product (e.g. the product being a mixture of different homopolymers/and co- or terpolymers) precise control of the multiple polymerization reactions in the reactor is required for repeatability in producing products. The need for reactor control is traditionally met by periodically analyzing the reaction product. In the production of bimodal resin systems, for example, this is most often done by analyzing the polymer product at some point in time after the material has been produced. But this practice suffers from the disadvantage that such a measurement is a cumulative reactor split, that is, a time average of the product produced as sampled from a reactor. Further, while the analytical approach for obtaining actual split data may be performed using different analytical techniques, for example GPC or SEC (gel permeation or size exclusion molar mass or molecular weight measurements), they are highly dependent on resin sampling, sample preparation, the generation of the data and the reduction of the data into an estimate of the fraction of each polymer in the product (e.g. SEC data must be deconvoluted and the individual molecular weight distributions estimated). Because the time required to determine reactor split using this process may be several hours (between the actual polymerization and the analysis of split), the data may be of little or no utility even when the sampling, measurement and data interpretation is accurate and precise. Additionally, the SEC (size exclusion chromatography) measurement is fairly cost intensive and prone to error and as such somewhat inadequate for process control, especially continuous process control. Accordingly, there is a need for improvements in mixed catalyst continuous polymerization process control. The present invention provides some solutions to this problem.

BRIEF SUMMARY OF THE INVENTION

The present invention is directed to a system and method which provides for predicting and controlling the production and composition (and thus physical properties) of a mixture of olefin-based polymers in a polymerization reactor system using at least two different catalyst systems to produce at least two polymer systems that may contain the same single monomer or two or more different monomers. It has been unexpectedly found that the instantaneous production rates of the separate polymer species within the reactor and their corresponding mass fractions produced by each different catalyst are linearly proportional to the incorporation of the monomers, reactants or other active species of the product produced.

In one aspect of the invention the polymers prepared from the multiple catalysts (for example a bimodal catalyst system such as a Zeigler-Natta catalyst and a metallocene catalyst) exhibit different mass fractions, typically further having different average molecular weights, one polymer having a relatively higher weight fraction in a composition and the other a relatively lower weight fraction; the instantaneously produced mass fraction of each polymer being linearly related to the ratio of the monomer(s) or reactant incorporation divided by the instantaneous reactor production rate.

In another aspect of the invention, the polymers produced exhibit different comonomer weight fraction distributions; the polymers may or may not have the same or different average molecular weights but the distribution of comonomers may be reflected by changes in the reactor split.

In one aspect of the invention there is provided a method for calculating the instantaneous reactor split of a polymerization reaction, the method comprising the steps of: producing under separate reaction conditions at least two polymeric compositions, each composition comprising at least two different polymers, each polymer having at least one different monomer or reactant incorporation; determining for each polymeric composition: the incorporation of at least one monomer or reactant, a corresponding reactor production rate and reactor split; and determining a linear equation defined by the reactor splits and corresponding ratios of monomer or reactant incorporation divided by the corresponding reactor production rate.

In another aspect of the invention there is provided a method of controlling reactor split in a multimodal polymerization reaction, comprising the steps of: applying a predetermined linear relationship to control a polymerization reaction in a reactor, polymerizing at least one monomer in the presence of at least two catalysts in the reactor; obtaining periodic incorporation and production rate data from the reactor; and adjusting periodically at least one reaction variable to maintain a desired reactor split according to the predetermined linear relationship. This method may be applied during an ongoing polymerization reaction or in a different reactor where the linear parameters are applied with a process controller to the reaction. The method may be further characterized by controlling at least one reactor process variable or monomer addition or other reactant addition to maintain a desired reactor split. The method provides for control of the split balance between multiple polymeric components in a polymerization where the polymers have different molecular parameters.

In another aspect of the invention there is provided a method for producing a polymer composition by controlling reactor split in a multimodal polymerization, comprising the steps of: determining a desired reactor split for a multimodal polymer composition based on a polymer composition physical property; polymerizing at least one monomer in the presence of at least two catalysts under conditions that yield the desired reactor split; and periodically adjusting at least one reaction variable according to a predetermined linear relationship to maintain the desired reactor split.

In still another aspect of the invention, the instantaneous splits are used to calculate a time average cumulative split.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following detailed description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present invention is directed to a system and method which provides for the production of olefin-based polymers in a reactor system that utilizes at least two different catalyst systems to produce at least two basic polymers that are combined into a single product (e.g. "bimodal polyolefins") where one product has a relatively higher incorporation by weight of a specific reactant and the other a relatively lower incorporation by weight of a specific reactant. A principal aim of the invention is to estimate and then control reactor split based on measured values obtained from the reactor and/or the polymerization by using the discovery that there is a linear relationship between instantaneous reactor split and the incorporation rate of a particular monomer or reactant.

In the present disclosure the following definitions are used:

The term "a" or "an" as used herein in the specification may mean one or more. As used herein in the claim(s), when used in conjunction with the word "comprising", the words "a" or "an" may mean one or more than one. As used herein "another" may mean at least a second or more.

"Analytical measurement" means any experimental technique that will provide reproducible data or information regarding the preparation, or analysis of any reactant, product or method of producing a reactant or product of the present invention.

"Average molecular weights" or "molecular weight" means any type of molecular weight average as applied in polymer science to describe a distributed molecular weight quantity where the polymer may be described by a mathematical distribution function such as but not limited to the "Z-average", "Weight average", "Number average", "Viscosity average" or "Light scattering average" molecular weights as are well known in the art. Typically these averages are expressed in terms of grams per mole or some other similar units as known in the art. In the case of non polymeric molecules the usual and accepted definition of molecular weight as known in the art applies.

"Bimodal polymerization" means any polymer product or composition that can be shown to exhibit at least two separate distributions of some physical property such as weight fraction of monomer incorporation for a copolymer or molecular weight or mass distributions/mass fractions for two or more polymers. The term is construed to include polymerizations where three or more distributions may be present and may accordingly be referred to as "multimodal" polymerization (e.g. a "trimodal" polymerization).

"Chemical analysis" means any technique that will provide compositional information for a bi- or multimodal polymer composition based on chemical reactions between a reagent and a polymeric composition such that the analysis will differentiate between different portions of the reactor split.

"Chromatography" in the context of polymer analysis means any analytical technique that separates polymer molecules and can be used to show a relative contribution to the mass fraction of a polymer sample, for example a bimodal polymerization. Included in this definition are so-called "SEC": size exclusion chromatography or "GPC": gel permeation chromatography which are well known in the art of polymer analysis.

"Copolymer" means any composition or reaction product that results in the production of a molecule or molecules comprising at least two monomers; a "terpolymer" would be included in this definition.

"Incorporation" or "Incorporation rate" means the amount of any monomer or reactant or other additive incorporated into a polymer product or composition per unit time and is a rate function. Incorporation may also be defined as the amount of a monomer or reactant that has been incorporated into the molecular structure of a polymer. Incorporation may also be defined as the flow rate of a monomer or other reactant into a reactor minus the flow rate of that reactant that escapes the reactor not incorporated into a polymerization product or resin. For example, in the case of a gas phase polymerization reactor, the incorporation is the flow rate of a reactant into the reactor minus the amount of the reactant that escapes through the reactor vent, minus the amount of the reactant that escapes dissolved (but unreacted) in the polymer product or in the void spaces between polymer particles exiting the reactor minus the flux or in monomer or reactant per unit time in the reactor (i.e. dm/dt). The quantities of monomers or reactants may be measured with devices like mass flow meters or chromatographs, or other measuring devices so long as they are capable of yielding information that can be used to determine, alone or with suitable calibration or standards, quantities of reactants or monomers. Other devices useful for determining incorporation include thermometers, thermocouples, thermostats and the like-such devices may provide information to calculate incorporation on a thermodynamic, kinetic or material balance basis: all of these devices and known useful scientific methods may be used in conjunction with programmable reaction controllers (e.g. programmable digital computers) in a systematic, cooperative fashion to provide so-called real-time information regarding incorporation or incorporation rates of material components useful in the methods of the present invention.

"Instantaneous split" means the ratio of the fraction (mass or weight) of one component of a bimodal or multimodal polymerization to the sum of all components present at a particular time in a polymerization. For example, when a relatively higher molecular weight and another relatively lower molecular weight polymer are present the instantaneous split can be expressed as (e.g.-for the higher molecular weight component):

$$S = P_R^{HMW}/(P_R^{LMW} + P_R^{HMW}) \qquad \text{Eq.1.}$$

where S is the instantaneous split, $P_R^{HMW}$ is the high molecular weight component's production rate, and $P_R^{LMW}$ is the low molecular weight component's production rate.

"Linear relationship" or "linear correlation" means any mathematical approximation or function that can be used to define a line having a constant slope and an intercept on a coordinate axis.

"Production rate" is the time rate of production of a polymer product and may be measured as pounds per hour(lbs./hr) or tons per hour(t/hr). Production rate is also the summation of all the incorporations of all reactants and monomers that react to form a polymer composition at a particular time. Values for the production rate may be obtained from reactor heat balance and reaction mass balance data or other reactor data in a similar manner as incorporation is determined.

"Polymer composition" means the product of a polymerization reaction.

"Predetermined linear relationship or equation" means a linear relationship or equation relating the ratio of a monomer or reactant incorporation rate to a corresponding reactor production rate and the corresponding reactor split for a bi- or multimodal polymerization reaction. The definition also encompasses a linear relationship between any measurable physical quantity that is proportional to reactor split and that when changed also changes reactor split.

"Primary resin" means one of the polymeric products of a polymerization reaction produced by a catalyst in a binary or multi-catalyst system. It may refer to the largest fraction of a reactor split.

"Process variable" means any reaction, reactor or polymer variable that may be used to control the production of a polymeric product. The term may be construed to include pressure, temperature, gas composition, monomer(s) addition(s) or concentrations, reactant addition(s) or concentrations, catalyst(s) or catalyst(s) addition(s) and the like.

"Product characteristics" means the physico-chemical properties of a bimodal polymer composition comprising polymers synthesized by at least two different catalysts include but are not limited to molecular weight, melting point, flow point, melt index, freezing point, modulus (Young's, elastic, loss, and the like), viscosity, yield point, refractive index, transparency, or other optical property, heat distortion temperature, radiation resistance, fracture energy and the like. Product characteristics may also be determined by using computer calculations or predictions.

"Resin" means the product of a polymerization reaction and may be used synonymously with the term "polymer" or "polymer product" or "polymerization product" or "polymer composition".

"Reactant" means any reagent, or other material added to a polymerization reaction that becomes incorporated into a polymerization product in a measurable fraction, either directly, indirectly, or estimated. For example, hydrogen or aluminum alkyls and the like.

"Reactor process variable", "reactor variable", "reaction variable", "process variable" or other similar term means any reactor process control or material that may be varied to control the output of a reactor and includes but is not limited to temperature, pressure, gas composition, catalyst, catalyst feed rate, flow rates, reactor output rates, material input rates, material concentrations and the like.

"Reactor production rate" means the output rate of a polymer composition resulting from a polymerization reaction and is often expressed as kilograms per tons per hour or minute and is determinable by material and or heat balance using thermodynamic and/or kinetic methods when not directly measurable.

"Reactor split" or "split" means the fraction (weight or mass or other fraction) of one resin product produced by a particular catalyst in a total polymer sample.

"Relative production rate" means the rate of production of a primary resin in relation to the rate of production of a secondary resin and is a measure of reactor split.

"Secondary resin" means one polymeric product of a polymerization reaction produced by a second catalyst in a binary catalyst system.

"Total resin production rate" means the output from the reactor of the polymeric or resin product and is often expressed as kilograms or tons per minute or hour.

In one aspect of the invention there is provided a method for calculating the instantaneous reactor split of a polymerization reaction, the method comprising the steps of: producing under separate reaction conditions at least two polymeric compositions, each composition comprising at least two different polymers, each polymer having at least one different monomer or reactant incorporation; determining for each polymeric composition: the incorporation of at least one monomer or reactant, a corresponding reactor production rate and reactor split; and determining a linear equation defined by the reactor splits and corresponding ratios of monomer or reactant incorporation divided by the corresponding reactor production rate. In one embodiment of the invention, the technique used to estimate a reactor split is a chromatographic method such as size exclusion or gel permeation chromatography. It will be appreciated on understanding this aspect of the invention that producing additional compositions, measuring their reactor split, incorporation and production rates so as to produce a more accurate and exact linear correlation between split and incorporation as described may be performed. Additionally, the order of the steps is not especially critical and on understanding the invention variations in the steps is considered within the scope of the invention.

In another aspect of the invention there is provided a method of controlling reactor split in a multimodal polymerization reaction, comprising the steps of: applying a predetermined linear relationship between reactor split, incorporation and production rate to control a polymerization reaction in a reactor, polymerizing at least one monomer in the presence of at least two catalysts in the reactor; obtaining periodic incorporation and production rate data from the reactor; and adjusting periodically at least one reaction variable to maintain a desired reactor split according to the predetermined linear relationship. In one embodiment of this inventive aspect, the reactor process variable is a ratio of the catalyst that produces a first resin to the catalyst that produces a second resin. In another embodiment the reaction variable is the ratio of the catalyst feed rate that produces a first resin to the catalyst feed rate that produces a second resin. In another embodiment, the method further comprises the step of controlling at least one reactant concentration to maintain a desired reactor split. In another embodiment of the invention, the reactant is hydrogen. In another embodiment of the invention, a first catalyst is a metallocene catalyst and a second catalyst is a Zeigler-Natta catalyst. In still another embodiment of the invention, the split is controlled by the relative addition rates to a reaction of at least two monomers. In a preferred embodiment, one monomer is an alpha-olefin monomer having at least two carbon atoms and may be selected from the group consisting of ethylene, propene, butene, hexene, octene or mixtures thereof. In an especially preferred embodiment, one monomer is butene or hexene and a second monomer is ethylene.

In another embodiment, a manipulated process variable may be a selective catalyst promoter or inhibitor, reactor temperature, reactor gas composition or other reaction variable. In another aspect of the method there is provided the step of controlling at least one reactant concentration to maintain a desired reactor split and in an embodiment, the reactant may be hydrogen or other reactant that affects a preferential addition to or effect on the polymers produced. The method allows for controlling the balance of production between multiple polymeric components in a polymerization where the polymers having different molecular parameters (e.g. molecular weights, mass fractions and different incorporations of at least one monomer or other reactant). Process variables may likewise be used to control the reactor split and thus the product produced. In certain embodiments, these include but are not limited to reactant and monomer addition rates, temperature, pressure, gas compositions and other variables that can be used to vary reactant or monomer incorporation in a polymeric composition.

In another especially preferred embodiment of the invention ethylene may be reacted with two catalysts such as those described herein: the product produced is bimodal polyethylene and hydrogen is the selectively incorporated reactant.

In a further aspect of the invention, reactor split determined and subsequently controlled in the same or a different reactor upon knowing the linear correlation or relationship or equation that relates reactor split and incorporation. The reaction may be controlled by intermittently or periodically monitoring the reaction variables and adjusting them according to the estimated split determined by the predetermined linear relationship to maintain the desired reactor split.

In another embodiment of the invention, the catalyst may be combinations of an bis-amide-based catalyst, Zeigler-Natta catalyst, metallocene catalyst or similar olefin polymerization catalysts so long as the catalysts produce polymer species that are useful and discernable from one another in combinations. That is, each catalyst combination contemplated responds differently to changes in reaction conditions, monomer incorporation, reactant incorporation and the like so that at least two different values of the incorporation and/or production rates are obtainable and reactor split may be proportional to some physical quantity related to reactor split so that a linear equation with a non-zero slope may be determined or estimated according to the method. The catalysts may be added to a reactor as supported catalysts, either separately supported or on a single support; one catalyst may be a supported catalyst and the other a catalyst made up in a solution and added to the reactor; both catalysts may be made up in solutions and the solutions added separately or together. In addition the catalysts, either as solutions or supported, may be added to different parts of the reactor and at different rates, as desired. Variations in the catalyst addition schemes are considered within the scope of the invention.

In another aspect of the invention there is provided a method for producing a polymer composition by controlling reactor split in a multimodal polymerization, comprising the steps of: determining a desired reactor split for a multimodal polymer composition based on a polymer composition physical property; polymerizing at least one monomer in the presence of at least two catalysts under conditions that yield the desired reactor split; and periodically adjusting at least one reaction variable according to a predetermined linear relationship to maintain the desired reactor split. In one embodiment, the composition is a film grade bimodal high density polyethylene (that is a high molecular weight/lower molecular weight composition with improved processibility due to the different (typically lower) molecular weight fraction of the composition where high strength is a film product is required) and at least one monomer is ethylene and the at least two catalysts are co-supported Zeigler-Natta and metallocene dry catalysts. In another embodiment, the composition is a bimodal high density pipe grade polyethylene (that is a composition which can be fabricated into a thicker cross section product having relatively high impact strength-e.g. liquid carrying pipes such as commercial or residential water pipes) and at least one monomer is ethylene and the at least two catalysts are spray-dried bisamide catalyst and a metallocene catalyst. In preferred embodiments, at least one monomer is selected from the group consisting of ethylene, propylene, butene, hexene, octene or mixtures thereof and in an especially preferred embodiment of this aspect of the invention, one monomer is hexene and a second monomer is ethylene and the catalysts are selected from the group consisting of bisamide, metallocene, Zeigler-Natta, or mixtures thereof.

With a view toward the various aspects of the invention, the product characteristics of a bimodal or multimodal resin/polymer system are dependent on the distribution of the molecular species. The present invention provides for the online estimation of reactor split (that is the weight fraction of a primary resin component) of resins or polymers produced by binary or ternary catalyst systems in a single or multi stage reactor without relying on the periodic physical measurement of reactor split by an analytical method. The invention allows for the timely manipulation of process conditions to control reaction split and therefore product quality, making use of simple, fundamental models for split estimation/prediction. The estimation and prediction of split do not rely on any ongoing physical split measurement: it relies on mathematical relationships derived from material balance models and a component or components (e.g. monomers or reactants) which are unequally consumed by the two polymer constituents in the production of a bi- or multi-modal resin. Additionally, the methodology does not rely on significant use of specific model parameters other than knowing that each catalyst produces a resin that incorporates at least one reactant or monomer in different fractions. For example hexene might contribute 10 weight percent to a polymer polymerized by a first catalyst versus 20 weight percent in a second polymer polymerized by a second catalyst. The method is effective with bi- or multi-modal catalyst systems in which one reactant (such as hydrogen) or one particular monomer (such as hexene) is consumed selectively in relation to the generation of a particular resin component generated with a particular catalyst. The method is used to directly predict and control the instantaneous split of a bimodal or multi-modal polymerization reaction to a targeted value. Instantaneous split is controlled in order to provide a desired cumulative split.

The method provides an improved measurement of reactor conditions. For example, a typical industry practice is to determine reactor split by intermittent measurements of cumulative split (the bulk average property) using an analytical technique such as size exclusion chromatography for products with bimodal molecular weight distributions. But the effectiveness of this approach is dependent on resin sampling, sample preparation, generation of the SEC data, and reduction of data to a split estimate (i.e. deconvolution of chromatograms). This process is generally not effective for control of a reactor because of the substantial delay in providing feedback to the process operation. Additionally, this method is fairly cost intensive and prone to errors due to the complexities involved. In contrast, the present invention allows for a more direct estimate of resin quality in a mixed catalyst polymerization process.

The present inventive method is predicated on the discovery that the instantaneous split is linearly related to the incorporation, as defined above, of any particular reactant (such as hydrogen), a monomer or a comonomer (such as ethylene or hexene, etc.), in one polymer or resin where that particular reactant or monomer is more susceptible to reaction with one particular catalyst under a particular set of reaction conditions (constant temperature, pressure and gas composition). The change in the amount of a reactant or monomer in the reactor is measurable or calculable and by changing any factor that affects the production rate of a particular component, in combination with knowing the reactor output or production rate, an immediately available estimate of the instantaneous split is obtainable.

For any component, monomer or other reactant that is materially incorporated into polymers by the different catalysts in different, measurable quantities, ($H_2$, $C_6$, $C_2$, etc) under the same or different reaction conditions, the incorporation may be given where Cx is the component of interest, and the two polymer species differ in their average molecular weight (or relative mass fraction in a sample) or other molecular property as:

$I^{Cx} = X_L^{Cx} PR_L + X_H^{Cx} PR_H$ where: $I^{Cx}$ is the incorporation (rate) of the $C_x$ monomer or alternatively other reactant; $X_L^{Cx}$ is the weight fraction of comonomer or reactant incorporated into a first catalyst component, $X_H^{Cx}$ is the weight fraction of the comonomer in the resin produced by the other catalyst component. $PR_L$ and $PR_H$ are the production rates of the two polymer components.

Accordingly, $$PR_{Tot.} = PR_H + PR_L, \qquad \text{Eq. 2.}$$

then $$I^{Cx} = X_L^{Cx}(PR_{Tot.} - PR_H) + X_H^{Cx} PR_H. \qquad \text{Eq. 3.}$$

applying the definition of instantaneous split, $S_I$ as:

$S_I = PR_H/PR_{Tot}$ and substituting into the previous equation, yields:

$$\frac{I^{Cx}}{PR_T} = X_L^{Cx}(1 - S_I) + X_H^{Cx} S_I \qquad \text{Eq. 4}$$

which can be solved for $S_I$ to yield the following relationship for split:

$$S_I = \frac{\left(\frac{I^{Cx}}{PR_T} - X_L^{Cx}\right)}{(X_H^{Cx} - X_L^{Cx})} \qquad \text{Eq. 5}$$

and $$S_I = A + B \times \frac{I_{Cx}}{PR_T} \qquad \text{Eq. 6}$$

where $$A = -\frac{X_L^{Cx}}{X_H^{Cx} - X_L^{Cx}}, \text{ and} \qquad \text{Eq. 7}$$

$$B = \frac{1}{X_H^{Cx} - X_L^{Cx}} \qquad \text{Eq. 8}$$

provided that:

$$X_H^{Cx} - X_L^{Cx} \neq 0. \qquad \text{Eq. 9.}$$

Thus, during a reaction at constant conditions (temperature, gas composition and pressure), the instantaneous split can be obtained by knowing the total polymer production rate, and the incorporation of the component(s) of interest because Eq. 6 shows that there is a linear relationship between split and the ratio of incorporation and production rates and measured or proportional values of split. The method is predicated on the condition that the weight fractions of Cx are different in the two constituent polymers and only a single reactant or monomer must meet the above criteria. It is only relevant that the slope and intercept of Eq. 6 are functions of the relative mass fractions of the at least two basic polymers produced. The type or kind of species distribution is not critical. That is the molecular weight, chain branching, relative density, etc. are not critical to the calculation of split by the present method.

Data on multiple splits are obtained when more than two resin components are present (i.e. "multimodal splits"). The associated splits are similarly used to control the reactor and thus control resin properties. The multimodal splits are calculated in a fashion similar to the bimodal case but by using vector and matrices (rather than scalar) relationships as shown below. The following mathematical relationships are denoted as "Eq." for convenience and those of skill in the art will realize they refer to vectors and matrices.

For multi-modal (i.e., 'n' modal) systems, split may be described as a vector quantity as follows:

$$\overline{S} = \overline{A} + \overline{B} \times \overline{I} \qquad \text{Eq. 10.}$$

where:

$$\overline{S} = \begin{bmatrix} S_1 \\ S_2 \\ \vdots \\ S_n \end{bmatrix}; \overline{A} = \begin{bmatrix} A_1 \\ A_2 \\ \vdots \\ A_n \end{bmatrix}; \overline{B} = \begin{bmatrix} B_{11} & B_{12} & \cdots & B_{1n} \\ B_{21} & B_{22} & \cdots & \vdots \\ \vdots & \vdots & \vdots & \vdots \\ B_{n1} & \cdots & \cdots & B_{nn} \end{bmatrix}; \overline{I} = \begin{bmatrix} I_1/PR \\ I_2/PR \\ \vdots \\ I_n/PR \end{bmatrix} \qquad \text{Eq. 11}$$

$S_i$=(Mass of component 'i'/Total mass of resin) for i=1, 2,3 ... n $I_i$=(Incorporation of component 'i') for i=1,2,3 ... n PR=total production rate of the reactor Because these various quantities are either available through estimation or are measurable, the instantaneous values of the individual product component splits may be obtained and once those quantities are known they may be used with the linear relationship as shown in equation 6 for the bimodal case and equation 10 for the multimodal case to control the reaction through periodic measurements of reactor/monomer/reactant conditions followed by appropriate adjustments to a desired value. Accordingly, product properties are controlled. Production rates are available through material balance and/or heat balance data and the incorporation data is similarly available using material consumption and recovery data. As the split is proportional to the ratio of the incorporation of a reactant or monomer into the final product and the production rate obtaining at least two experimental values of this ratio and determining split experimentally for those values, or a quantity that is proportional to split (that reflects a change in the composition of a bi- or multi-modal sample) a linear correlation between split and incorporation may be obtained. Accordingly, splits may be obtained in subsequent reaction or periodically in a continuous reaction as long as the reaction conditions that effect the individual resin incorporation fractions are the same.

Finally, during a reactor transition between two different products having different splits, the incorporation parameters likely would change and this would be predictable by a resin property model, e.g. a description of physical properties ascribed to a resin comprising multiple types of polymers synthesized together where the incorporation parameters are known. Thus transition of reactor conditions between desired products may be performed and the approach to the desired reactor conditions monitored with the methods according to the present invention.

Fluidized-Bed Reactors

Fluidized-bed reactors are well-known in the art and are preferred in applying the methods according to the present invention. A particular, non-limiting example of a fluidized bed reactor is described herein, in FIG. 1. for illustrative purposes only. Those skilled in the art will recognize that numerous modifications and enhancements can be made, as desired, to the fluidized-bed reactor to practice the methods of the present invention. Additionally, as will be recognized by those skilled in the art, other polymerization reactors will be useful in practicing the present inventive method.

Figure 1:
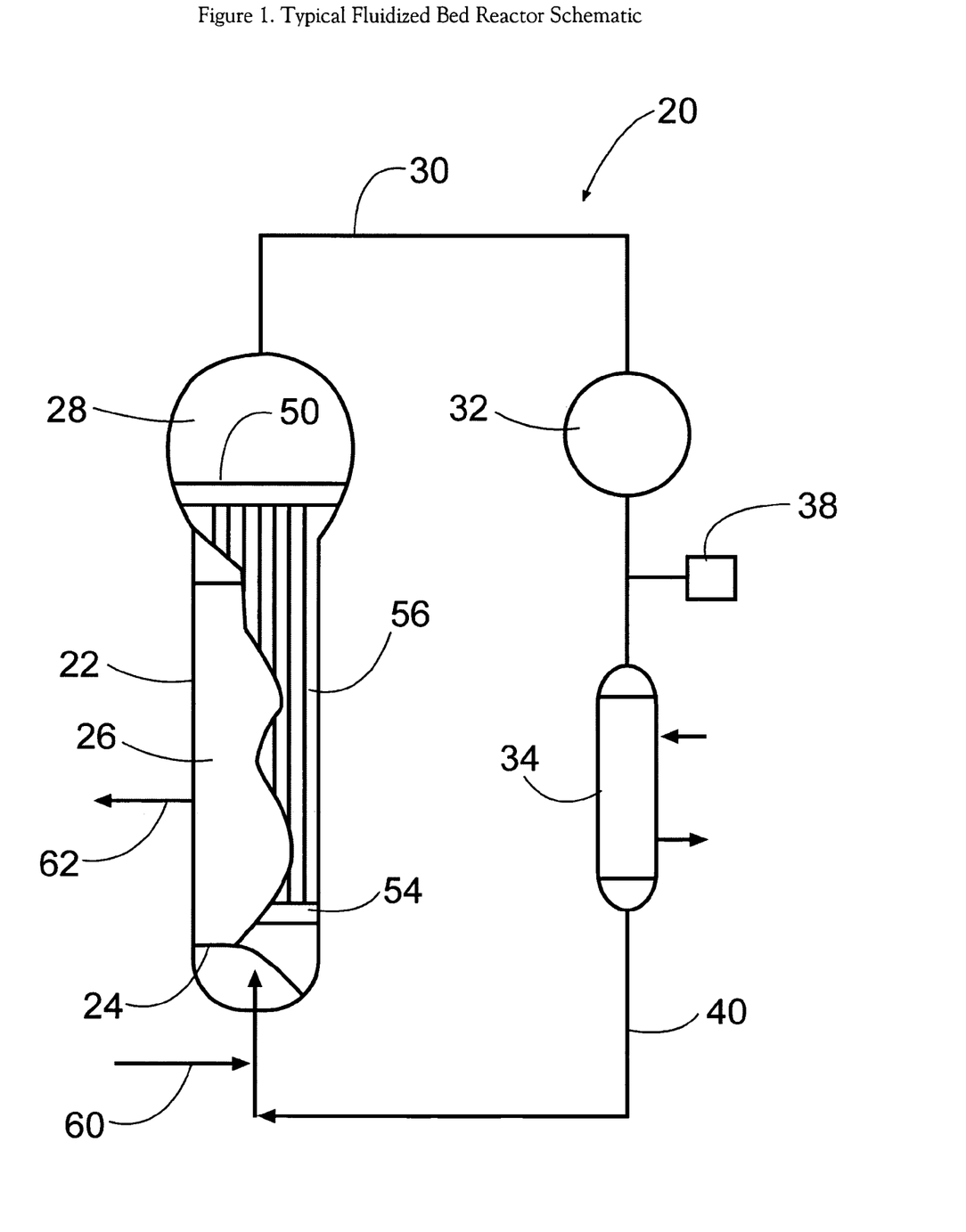
FIG. 1 is a schematic of a typical fluidized bed reactor useful for practicing the methods present invention.
Figure 2:
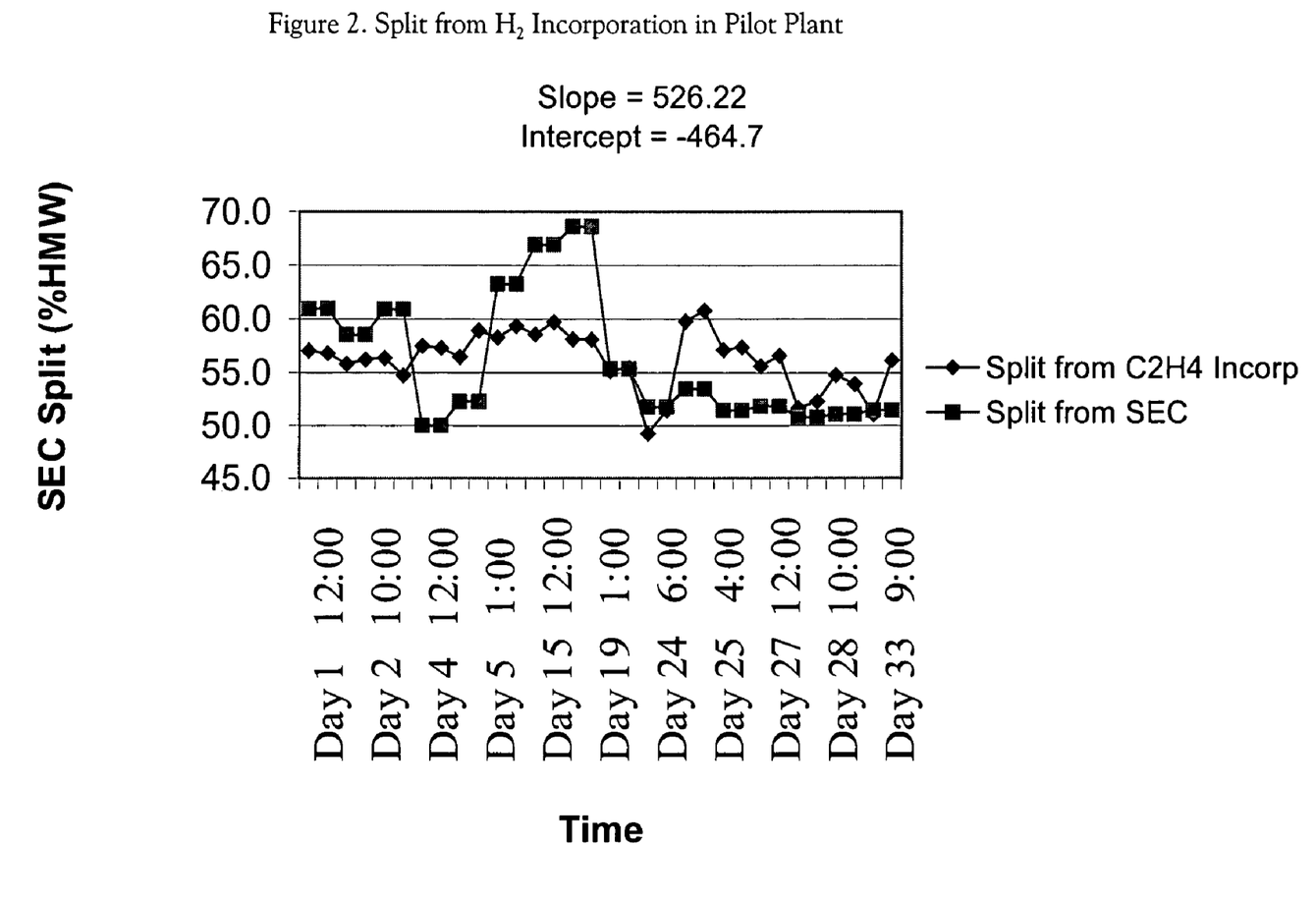
FIG. 2 is a graph of ethylene incorporation vs. time according to Example 1.
Figure 3:
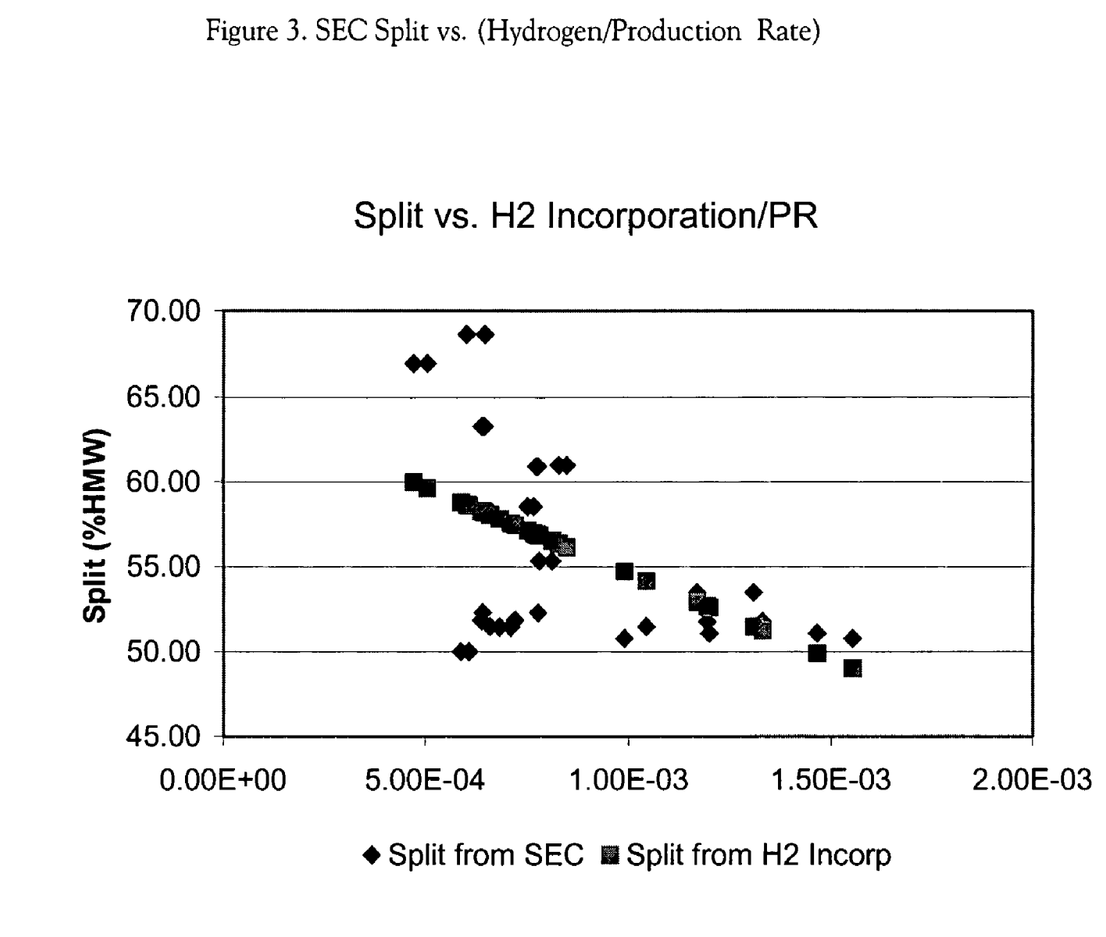
FIG. 3. is a graph of reactor split vs. hydrogen incorporation divided by the reactor production rate.
Figure 4:
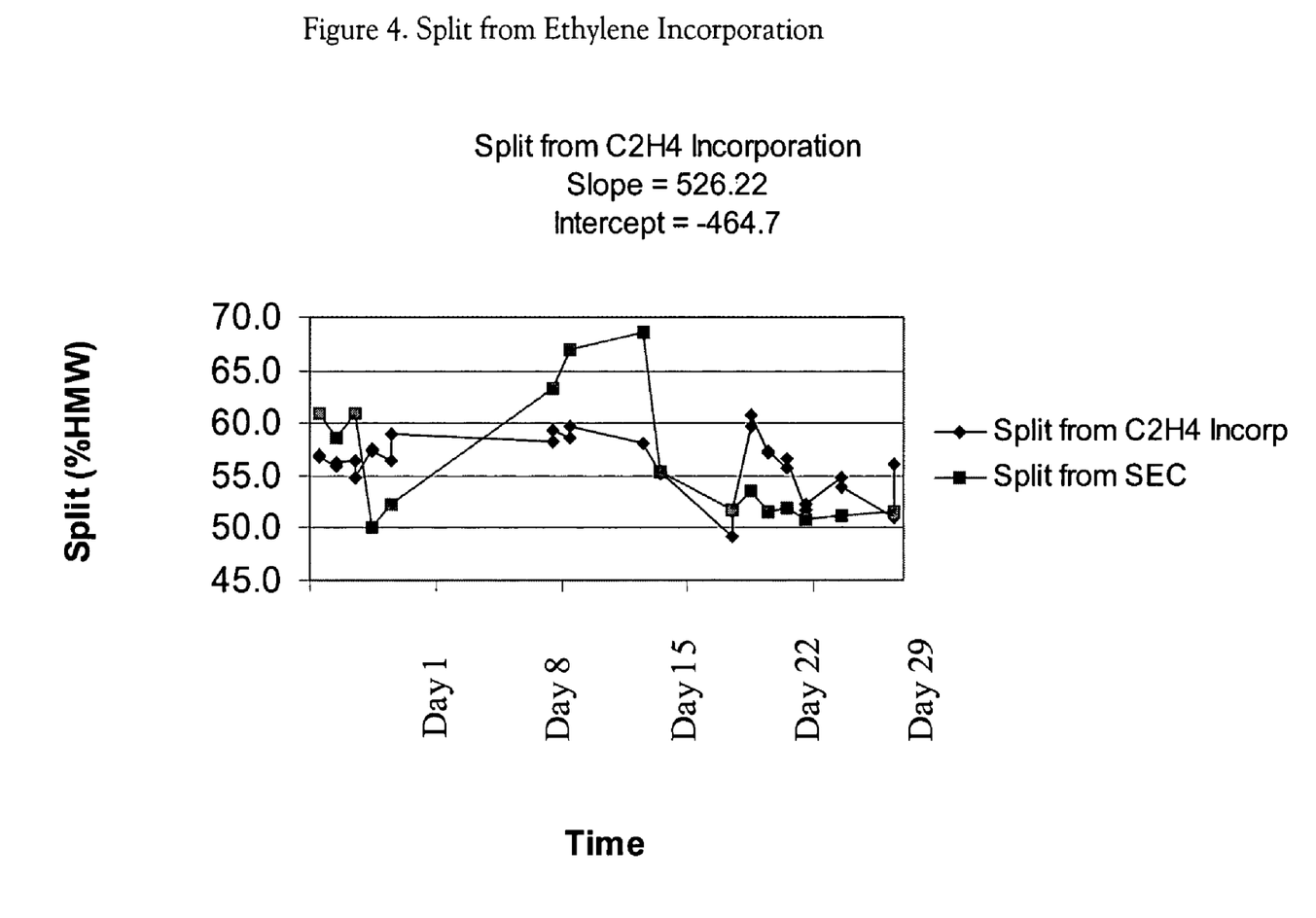
FIG. 4 is a graph of reactor split from ethylene incorporation according to Example 1.
Figure 5:
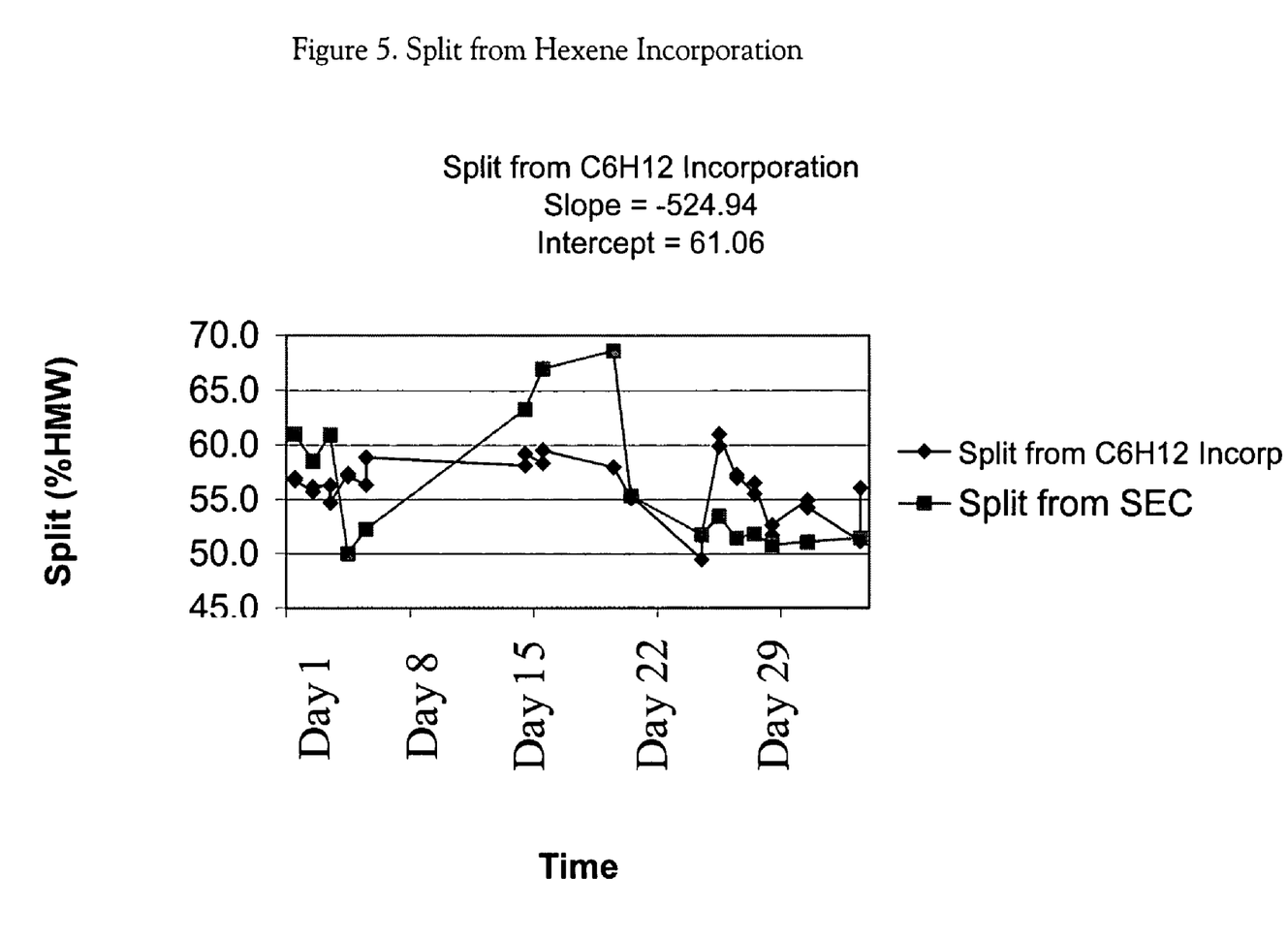
FIG. 5. is a graph of reactor split from hexene incorporation according to Example 1.

FIG. 1 illustrates a gas-phase fluidized bed reactor 20 useful in performing certain non-limited examples of the present method. The reactor 20 has a reactor body 22, which is generally an upright cylinder having a fluidization grid 24 located in its lower regions. The reactor body 22 encloses a fluidized bed zone 26 and a velocity reduction zone 28 which is generally of increased diameter compared to the diameter of the fluidized bed zone 26 of the reactor body 22.

The gaseous reaction mixture leaving the top of the reactor body 22, termed the "recycle gas stream," contains principally unreacted monomer, unreacted hydrogen gas, inert condensable gases such as isopentane, and inert non-condensable gases such as nitrogen. The recycle gas stream is transferred via line 30 to compressor 32, and from compressor 32 to heat exchanger 34. A gas analyzer 38 can be used to sample the recycle gas stream to determine concentrations of various components. Typically, the gas analyzer is a gas phase chromatograph (GC), or a spectrograph such as a near-infrared spectrometer(N) or a Fourier transform near-infrared spectrometer (FT-NIR). An additional heat exchanger (not shown) may also be used if desired, preferably upstream of compressor 32.

The cooled recycle gas stream exits the heat exchanger 34 via line 40. As discussed above, the cooled recycle gas stream can be gaseous, or can be a mixture of gaseous and liquid phases. This stream connects with the reactor in conjunction with the monomer make-up stream 60.

Those skilled in the art will understand that less gas is required to maintain fluidization when the reactor employed is a stirred bed reactor. In a preferred embodiment a stirred bed reactor is used to practice embodiments of the present invention, with or without the addition of a so-called condensed mode operation.

An optional compressor may be provided to ensure that a sufficient velocity is imparted to gases flowing into the bottom of the reactor. The gas stream entering the bottom of the reactor may contain condensed liquid, if desired.

All or a portion of the liquid phase separated from a recycle stream in a separator would be transferred to a manifold 50 located at or near the top of the reactor. If desired, a pump may be provided in-line to facilitate the transfer of liquid to manifold 50. The liquid entering manifold 50 flows downward into manifold 54 through a plurality of conduits 56 which have good heat exchange properties and which are in heat exchange contact with the wall of the reactor. The passage of liquid through the conduits 56 cools the interior wall of the reactor and warms the liquid to a greater or lesser extent, depending upon the temperature differential and the duration and extent of heat exchange contact. Thus by the time the liquid entering manifold 50 reaches manifold 54, it has become a heated fluid which may have remained in an entirely liquid state or it may have become partially or totally vaporized.

Make-up monomer may be introduced into the reactor in either liquid or gaseous form via line 60.

A gas which is inert to catalyst, such as nitrogen or argon, is preferably used to carry catalyst into the bed.

The catalysts may be introduced as supported catalysts, or a supported catalyst and a solution of another catalyst; or a solution of two catalysts either added separately or in combination. The solutions may be gaseous- or liquid-based. Additionally, the catalysts may be in the form of dry catalysts.

Product polymer particles may be removed from the reactor via line 62 in the conventional way, as for example by the method and apparatus described in U.S. Pat. No. 4,621,952.

Catalysts and Polymers

Catalysts for bimodal or multimodal polymerizations maybe continuously or intermittently injected into the reactor using a catalyst feeder (not shown), such as the device disclosed in U.S. Pat. No. 3,779,712. In one embodiment, the catalysts are preferably fed into the reactor at a point 20 to 40 percent of the reactor diameter away from the reactor wall and at a height of about 5 to about 30 percent of the height of the bed but these relationships are not critical for practicing the present invention. Suitable catalysts are any combination of catalysts that will preferably yield a bimodal or multimodal polymer product that contains at least one monomer that may be accurately measured while being added to a reactor and incorporated into the polymers being produced. Combinations of catalysts may preferably be Metallocene and Zeigler-Natta (i.e. "Zeigler" catalysts) as known in the art, or other catalysts such as amide-based catalysts that produce different polymer species. In other preferred embodiments, an amide based catalyst may be prepared according to the teaching of published U.S. Patent applications U.S.2003/0171206A1 and U.S.2003/0191012A1: they may be used in an especially preferred embodiment with a Metallocene or Zeigler-Natta catalyst to produce a bimodal homo- or copolymer system, for example bimodal polyethylene or a bimodal polyethylene-co-hexene copolymer.

In methods of the present invention, the fluidized bed reactor is operated to form polyolefins having at least one bimodal physical property (e.g. mass fraction) distribution and in co-polymers, at least a bimodal comonomer distribution. Such polyolefins include, but are not limited to, polyethylene(s), polypropylene, polyisobutylene, polybutylenes, polyhexenes, polyoctenes and copolymers thereof.

In one embodiment, the at least one polyolefin includes poly (ethylene-co-hexene) copolymers. In another, a bimodal polyethylene is produced. Other low density polyethylenes ("LDPE") can be prepared in the gas phase process using Ziegler-Natta or vanadium catalysts, and typically have a density in the range of 0.916–0.940 g/cm$^3$. Polyethylene in the same density range, i.e., 0.916 to 0.940 g/cm$^3$, which that are linear and does not contain long chain branching are known as "linear low density polyethylene" ("LLDPE") and can be produced with conventional Zieglar-Natta catalysts or with Metallocene catalysts. Relatively higher density LDPE, typically in the range of 0.928 to 0.940 g/cm$^3$, is sometimes referred to as medium density polyethylene ("MDPE"). Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylene "VLDPE") is also known. VLDPEs can be produced by a number of different processes yielding polymers with different properties, but can be generally described as polyethylenes having a density less than 0.916 g/cm$^3$, typically-0.890 to 0.915 g/cm$^3$ or 0.900 to 0.915 g/cm$^3$.

Polymers having more than two types of monomers, such as terpolymers, are also included within the scope of the term "copolymer" as used herein. Suitable comonomers include α-olefins, such as $C_3$–$C_{20}$ α-olefins or $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene, styrene and the like.

Other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acrylic dienes, such as 5-methyl-1,4-hexadiene; 3,7-dimethyl-1,6-octadiene; and 3,7-dimethyl-1,7octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

In a preferred embodiment at least two catalysts are a combination of a metallocene catalyst and a Ziegler or Ziegler-Natta catalyst that will produce a mixture of relatively higher and relatively lower molecular weight polymers admixed. In another preferred embodiment, an amide catalyst may be used in combination with either a metallocene or a Ziegler catalyst. In still another preferred embodiment a combination of three catalysts is used to prepare a multi-modal polymer system.

EXAMPLES

The following non-limiting Examples are provided to illustrate some specific embodiments of the present invention.

Example 1

Preparation of a Hexene Copolymer Resin in a Pilot Plant Reactor to Obtain Data for Split Estimation A copolymerization was run using hexene monomer and ethylene monomer. The reactor was a pilot plant reactor that can produce roughly between 50 and 70 lbs. of polymer or resin per hour. The basic reactor is roughly one foot in diameter and 10 feet in height. There is a transition to a conical section where the reactor diameter roughly quadruples. There is a third section in the top that is roughly 4 feet in diameter. The total height of the reactor is approximately 30 feet. A recycle gas stream loops from the top of the reactor and reenters the bottom of the reactor. There are two major pieces equipment attached to the recycle section: The first is a compressor that compresses the gas to maintain a flow of gas through the recycle stream and up the reactor. The second is a heat exchanger that removes heat from the reactor thereby controlling the reaction temperature. Product is removed from the fluidized bed using a product discharge tank, separated from the reactor by a cycled automated valve. The discharge system works by holding the discharge tank at a pressure lower than in the reactor and the resin is pneumatically forced into the tank when the valve opens. The valve closes and the tank is vented and purged. Subsequently, after sufficient purging, the resin drops through another valve into a storage drum.

The process was run by varying the catalyst feed rate ratios (one catalyst was a metallocene catalyst, the other a Zeigler-Natta catalyst) to obtain different values for the incorporation for each monomer (ethylene and 1-hexene) and reactant (hydrogen) used to determine split. The incorporation information for ethylene, hexene and hydrogen was obtained by calculating the mass flow rate into the reactor and subtracting the measured loss terms as defined above. This data is shown in Table 1, divided by the production rate. SEC split data corresponding to the different values of catalyst feed ratio were determined using a standard method for obtaining resolution of mass fractions of the polymer sample produced in the reactor. The calculated split data was determined from the linear equation plotted for ethylene, hexene and hydrogen as shown in FIGS. 2–5 inclusive. This data illustrates the generally good agreement between the measured cumulative splits from SEC and the calculated instantaneous splits determined by the method of the present invention.

TABLE 1

Pilot Reactor - Split Data Set 1

| Time | $C_2$ Incorp/PR | $C_6$ Incorp/PR | $H_2$ Incorp/PR | Split from SEC | Split from C2H4 Incorp | Split from C6H12 Incorp | Split from H2 Incorp | Cat Feed Ratio |
|---|---|---|---|---|---|---|---|---|
| Day 1 12:00:00 PM | 0.9914 | 0.0077 | 8.48E−04 | 60.97 | 57.0 | 57.0 | 56.2 | 5.6 |
| Day 1 13:00:00 PM | 0.9910 | 0.0082 | 8.29E−04 | 60.97 | 56.8 | 56.8 | 56.4 | 5.6 |
| Day 2 9:00:00 AM | 0.9891 | 0.0102 | 7.51E−04 | 58.54 | 55.8 | 55.7 | 57.1 | 5.6 |
| Day 2 10:00:00 AM | 0.9899 | 0.0094 | 7.66E−04 | 58.54 | 56.2 | 56.1 | 57.0 | 5.6 |
| Day 3 6:00:01 AM | 0.9902 | 0.0091 | 7.76E−04 | 60.90 | 56.3 | 56.3 | 56.9 | 5.6 |
| Day 3 7:00:01 AM | 0.9871 | 0.0121 | 7.73E−04 | 60.90 | 54.7 | 54.7 | 56.9 | 5.6 |
| Day 4 12:00:01 PM | 0.9924 | 0.0070 | 6.07E−04 | 50.00 | 57.5 | 57.4 | 58.6 | 5.6 |
| Day 4 1:00:01 PM | 0.9920 | 0.0074 | 5.88E−04 | 50.00 | 57.3 | 57.2 | 58.8 | 5.6 |
| Day 5 12:00:01 PM | 0.9904 | 0.0090 | 6.42E−04 | 52.26 | 56.5 | 56.4 | 58.3 | 5.6 |
| Day 5 1:00:01 PM | 0.9951 | 0.0041 | 7.78E−04 | 52.26 | 58.9 | 58.9 | 56.9 | 5.6 |
| Day 14 12:00:00 PM | 0.9938 | 0.0055 | 6.39E−04 | 63.26 | 58.3 | 58.1 | 58.3 | 5.6 |
| Day 14 1:00:00 PM | 0.9959 | 0.0035 | 6.45E−04 | 63.26 | 59.4 | 59.2 | 58.2 | 5.6 |
| Day 15 12:00:00 PM | 0.9944 | 0.0051 | 4.72E−04 | 66.94 | 58.6 | 58.4 | 60.0 | 5.5 |
| Day 15 1:00:00 PM | 0.9966 | 0.0029 | 5.06E−04 | 66.94 | 59.7 | 59.5 | 59.6 | 5.5 |
| Day 19 12:00:00 PM | 0.9935 | 0.0059 | 6.02E−04 | 68.62 | 58.1 | 58.0 | 58.7 | 5.5 |
| Day 19 1:00:00 PM | 0.9935 | 0.0059 | 6.47E−04 | 68.62 | 58.1 | 58.0 | 58.2 | 5.5 |
| Day 20 3:00:00 PM | 0.9879 | 0.0113 | 8.13E−04 | 55.33 | 55.1 | 55.1 | 56.5 | 4.2 |
| Day 20 4:00:00 PM | 0.9884 | 0.0108 | 7.80E−04 | 55.33 | 55.4 | 55.4 | 56.9 | 4.2 |
| Day 24 6:00:00 AM | 0.9766 | 0.0220 | 1.33E−03 | 51.76 | 49.2 | 49.5 | 51.3 | 4.2 |
| Day 24 7:00:00 AM | 0.9808 | 0.0180 | 1.20E−03 | 51.76 | 51.4 | 51.6 | 52.6 | 4.2 |
| Day 25 3:00:00 PM | 0.9967 | 0.0022 | 1.17E−03 | 53.46 | 59.8 | 59.9 | 52.9 | 4.2 |
| Day 25 4:00:00 PM | 0.9986 | 0.0001 | 1.31E−03 | 53.46 | 60.8 | 61.0 | 51.5 | 4.2 |
| Day 26 9:00:00 AM | 0.9916 | 0.0077 | 6.83E−04 | 51.45 | 57.1 | 57.0 | 57.8 | 4.2 |
| Day 26 10:00:00 AM | 0.9921 | 0.0072 | 7.10E−04 | 51.45 | 57.4 | 57.3 | 57.6 | 4.2 |
| Day 27 12:00:00 PM | 0.9888 | 0.0106 | 6.38E−04 | 51.83 | 55.6 | 55.5 | 58.3 | 4.2 |
| Day 27 1:00:00 PM | 0.9906 | 0.0086 | 7.21E−04 | 51.83 | 56.6 | 56.5 | 57.5 | 4.2 |
| Day 28 9:00:01 AM | 0.9813 | 0.0177 | 9.90E−04 | 50.79 | 51.7 | 51.7 | 54.7 | 4.2 |
| Day 28 10:00:01 AM | 0.9824 | 0.0160 | 1.55E−03 | 50.79 | 52.3 | 52.7 | 49.0 | 4.2 |
| Day 30 6:00:01 PM | 0.9871 | 0.0117 | 1.20E−03 | 51.08 | 54.7 | 54.9 | 52.6 | 4.2 |
| Day 30 7:00:01 PM | 0.9856 | 0.0130 | 1.47E−03 | 51.08 | 53.9 | 54.2 | 49.9 | 4.2 |
| Day 33 9:00:01 AM | 0.9801 | 0.0188 | 1.05E−03 | 51.46 | 51.1 | 51.2 | 54.2 | 4.2 |
| Day 33 10:00:01 AM | 0.9898 | 0.0096 | 6.59E−04 | 51.46 | 56.1 | 56.0 | 58.1 | 4.2 |
| Slope (B from Eq. 6) | 526.22 | 524.94 | 10,142.26 | | | | | |
| Intercept (A from Eq. 6) | −464.70 | 61.06 | 64.77 | | | | | |

Example 2

Figure 6:
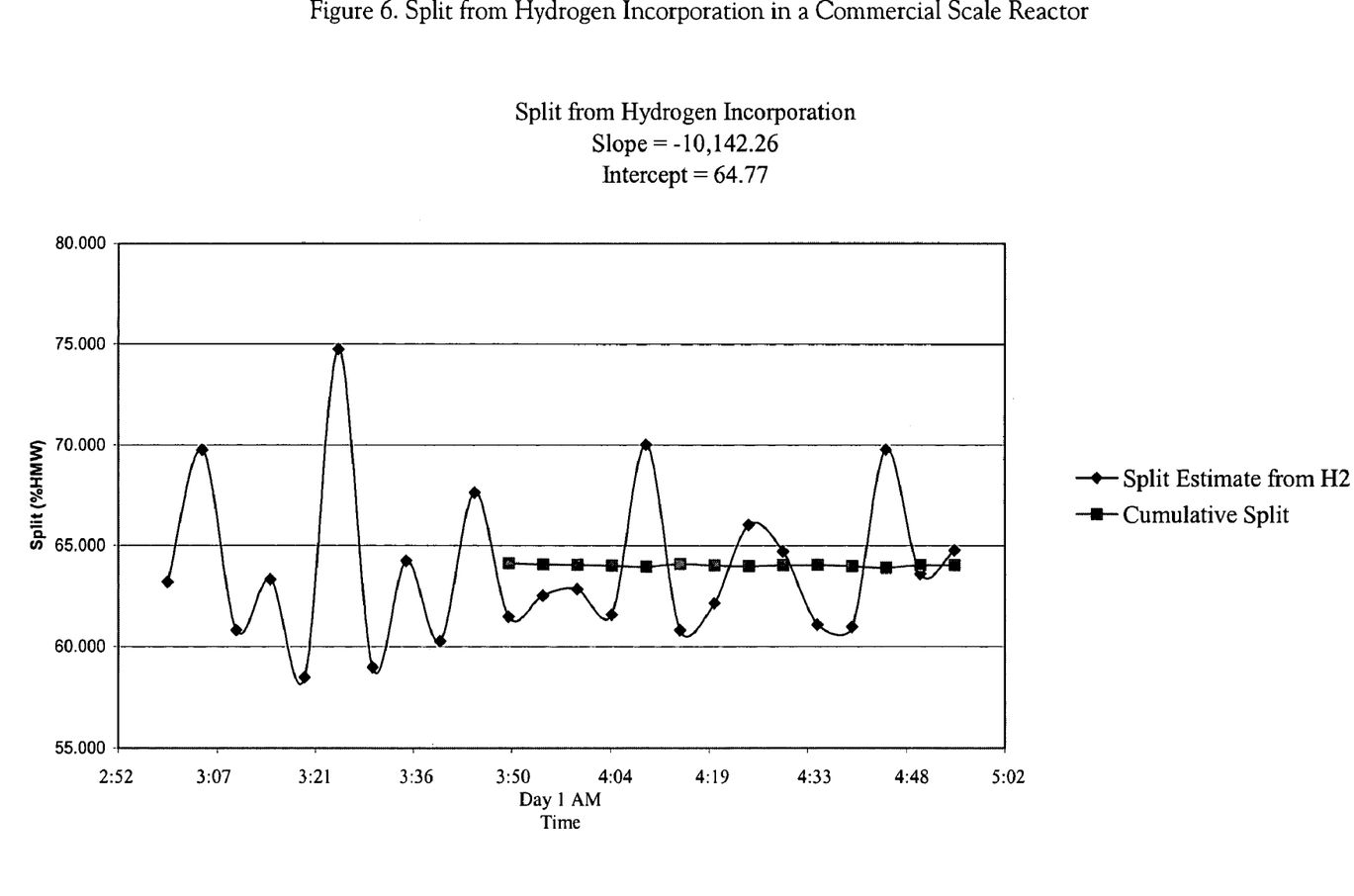
FIG. 6. is a graph of estimated reactor split from hydrogen incorporation in a commercial reactor and a comparison with the calculated cumulative reactor split based on a moving average of the instantaneous splits.

Application of Calculated Splits to Commercial Scale Production of Bimodal Polyethylene A commercial scale production of bimodal polyethylene-co-hexene was performed using the same catalyst systems as in Example 1 and similar relative proportions of monomers, and hydrogen (gas composition) The calculated instantaneous splits (using the slope and intercepts for Hydrogen that were calculated in Example 1) are shown in Table 2. along with the calculated cumulative splits (based on a moving average). A comparison of the calculated instantaneous split data along with calculated cumulative split data from SEC data are shown in FIG. 6.

TABLE 2

Production Reactor Split Data Set, Example 2

| Time | C2 Incorp/PR | C6 Incorp/PR | H2 Incorp/PR | Split Estimate from H2 | Cumulative Split |
|---|---|---|---|---|---|
| Day 1 3:00 AM | 0.983 | 0.015 | 0.00062 | 63.213 | |
| Day 1 3:05 AM | 0.984 | 0.016 | 0.00015 | 69.733 | |
| Day 1 3:10 AM | 0.984 | 0.015 | −0.00049 | 60.806 | |

TABLE 2-continued

Production Reactor Split Data Set, Example 2

| Time | C2 Incorp/PR | C6 Incorp/PR | H2 Incorp/PR | Split Estimate from H2 | Cumulative Split |
|---|---|---|---|---|---|
| Day 1 3:15 AM | 0.984 | 0.015 | 0.00039 | 63.327 | |
| Day 1 3:20 AM | 0.985 | 0.015 | 0.00014 | 58.477 | |
| Day 1 3:25 AM | 0.984 | 0.015 | 0.00062 | 74.729 | |
| Day 1 3:30 AM | 0.984 | 0.017 | −0.00098 | 58.957 | |
| Day 1 3:35 AM | 0.985 | 0.014 | 0.00057 | 64.252 | |
| Day 1 3:40 AM | 0.984 | 0.015 | 0.00005 | 60.276 | |
| Day 1 3:45 AM | 0.983 | 0.016 | 0.00044 | 67.617 | |
| Day 1 3:50 AM | 0.985 | 0.014 | −0.00028 | 61.480 | 64.135 |
| Day 1 3:55 AM | 0.983 | 0.016 | 0.00032 | 62.529 | 64.078 |
| Day 1 4:00 AM | 0.984 | 0.016 | 0.00022 | 62.850 | 64.045 |
| Day 1 4:05 AM | 0.985 | 0.015 | 0.00019 | 61.583 | 64.020 |
| Day 1 4:10 AM | 0.985 | 0.014 | 0.00031 | 70.013 | 63.968 |
| Day 1 4:15 AM | 0.984 | 0.015 | −0.00052 | 60.809 | 64.098 |
| Day 1 4:20 AM | 0.984 | 0.015 | 0.00039 | 62.160 | 64.029 |
| Day 1 4:25 AM | 0.985 | 0.014 | 0.00026 | 66.027 | 63.989 |
| Day 1 4:30 AM | 0.984 | 0.016 | −0.00012 | 64.715 | 64.033 |
| Day 1 4:35 AM | 0.984 | 0.015 | 0.00001 | 61.078 | 64.048 |
| Day 1 4:40 AM | 0.984 | 0.015 | 0.00036 | 60.979 | 63.984 |
| Day 1 4:45 AM | 0.984 | 0.015 | 0.00037 | 69.746 | 63.920 |
| Day 1 4:50 AM | 0.985 | 0.015 | −0.00049 | 63.599 | 64.043 |
| Day 1 4:55 AM | 1.000 | 0.000 | 0.00012 | 64.770 | 64.034 |

Slope −10142.260
Intercept 64.770

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, and composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for calculating the instantaneous reactor split of a polymerization reaction, the method comprising the steps of:
    producing under separate reaction conditions at least two polymeric compositions, each composition comprising at least two different polymers, each polymer having at least one different monomer or reactant incorporation;
    determining for each polymeric composition: the incorporation of at least one monomer or reactant, a corresponding reactor production rate and reactor split; and
    determining a linear equation defined by the reactor splits and corresponding ratios of (monomer or reactant incorporation/production rate).

2. The method of claim 1 wherein the reactor split is determined by a chromatographic method.

3. The method of claim 2 wherein the chromatographic method is size exclusion chromatography.

4. A method of controlling reactor split in a multimodal polymerization reaction, comprising the steps of:
    applying a predetermined linear relationship to control a polymerization reaction;
    polymerizing at least one monomer in the presence of at least two catalysts;
    obtaining periodic incorporation and production rate data from the reaction; and
    adjusting periodically at least one reaction variable to maintain a desired reactor split according to the predetermined linear relationship.

5. The method of claim 4 wherein the reaction variable is a ratio of the catalyst that produces a first resin to the catalyst that produces a second resin.

6. The method of claim 4 wherein the reaction variable is the ratio of the catalyst feed rate that produces a first resin to the catalyst feed rate that produces a second resin.

7. The method of claim 4 further comprising the step of controlling at least one reactant concentration to maintain a desired reactor split.

8. The method of claim 7 wherein the reactant is hydrogen.

9. The method of claim 4 wherein a first catalyst is a metallocene catalyst and a second catalyst is a Zeigler-Natta catalyst.

10. The method of claim 4 wherein a first catalyst is a metallocene catalyst and a second catalyst is a bisamide catalyst.

11. The method of claim 4 wherein the incorporation is controlled by the relative addition rates of at least two monomers to the reactor.

12. The method of claim 4 wherein one monomer is an alpha-olefin monomer having at least two carbon atoms.

13. The method of claim 4 wherein one monomer is selected from the group consisting of ethylene, propylene, butene, hexene, octene and mixtures thereof.

14. The method of claim 11 wherein one monomer is butene or hexene and a second monomer is ethylene.

15. A method of producing a polymer composition by controlling the reactor split of a multimodal polymerization, comprising the steps of:

determining a desired reactor split for a multimodal polymer composition based on at least one physical property of the composition;

polymerizing at least one monomer in the presence of at least two catalysts under conditions that yield a composition having the desired reactor split; and periodically adjusting at least one reaction variable according to a predetermined linear relationship to maintain the desired reactor split.

16. The method of claim 15 wherein the composition is a film grade bimodal high density polyethylene and at least one monomer is ethylene and the at least two catalysts are co-supported Zeigler-Natta and metallocene dry catalysts.

17. The method of claim 15 wherein the composition is bimodal high density pipe grade polyethylene and at least one monomer is ethylene and the at least two catalysts are spray-dried bisamide catalyst and a metallocene catalyst.

18. The method of claim 15 wherein the at least one monomer is selected from the group consisting of ethylene, propylene, butene, hexene, octene and mixtures thereof.

19. The method of claim 15 wherein one monomer is hexene and a second monomer is ethylene and the catalysts are selected from the group consisting of bisamide, metallocene, Zeigler-Natta, and mixtures thereof.

* * * * *